Feb. 17, 1970 J. MARCOVITCH 3,495,428
PROFILING OF SOLID CYLINDRICAL WORKPIECES
Filed Aug. 11, 1967 8 Sheets-Sheet 1
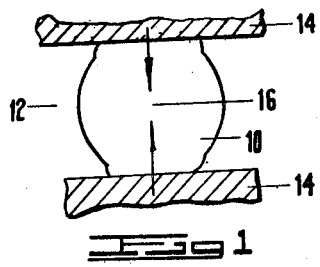
Fig. 1
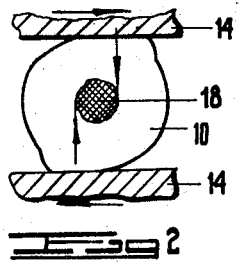
Fig. 2
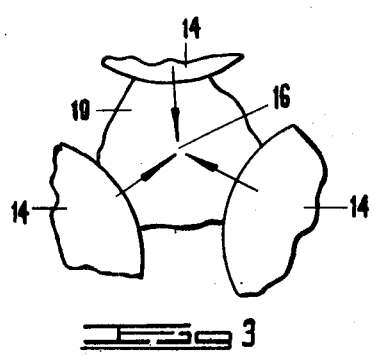
Fig. 3
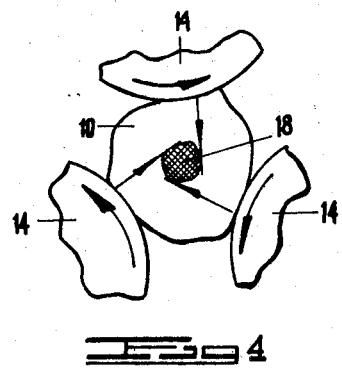
Fig. 4
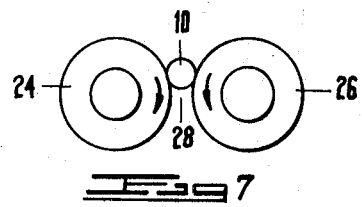
Fig. 7
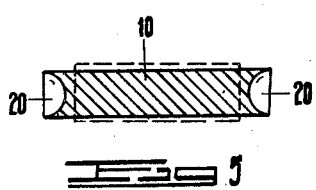
Fig. 5
Fig. 6
INVENTOR
JACOB MARCOVITCH
By Young + Thompson
ATTYS.

Feb. 17, 1970 J. MARCOVITCH 3,495,428
PROFILING OF SOLID CYLINDRICAL WORKPIECES
Filed Aug. 11, 1967 8 Sheets-Sheet 2

INVENTOR
JACOB MARCOVITCH
BY Young + Thompson
ATTYS.

Feb. 17, 1970   J. MARCOVITCH   3,495,428
PROFILING OF SOLID CYLINDRICAL WORKPIECES
Filed Aug. 11, 1967   8 Sheets-Sheet 3
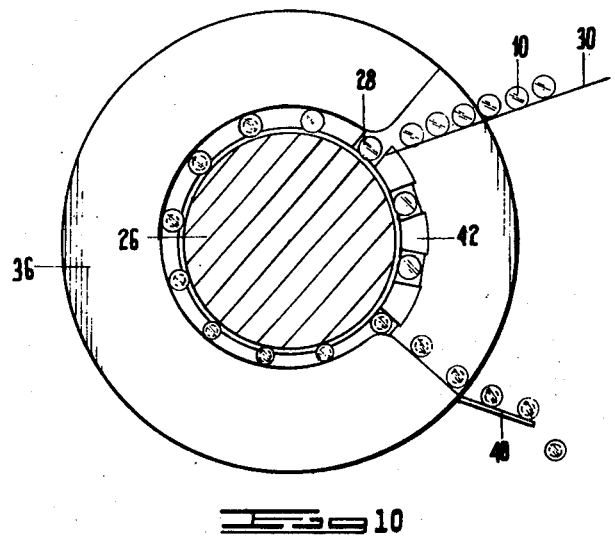
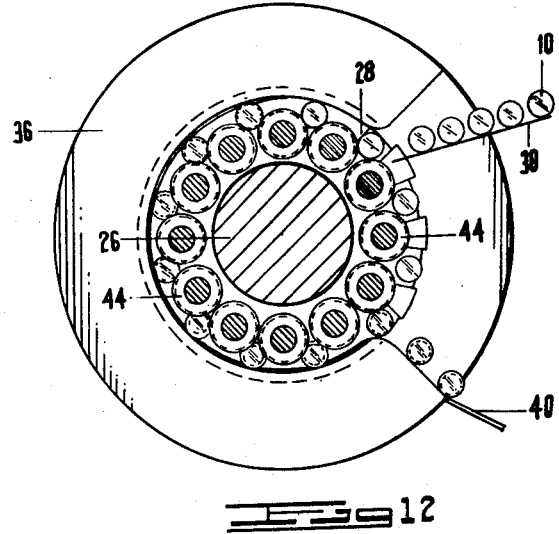
INVENTOR
JACOB MARCOVITCH
By Young + Thompson
ATTYS.

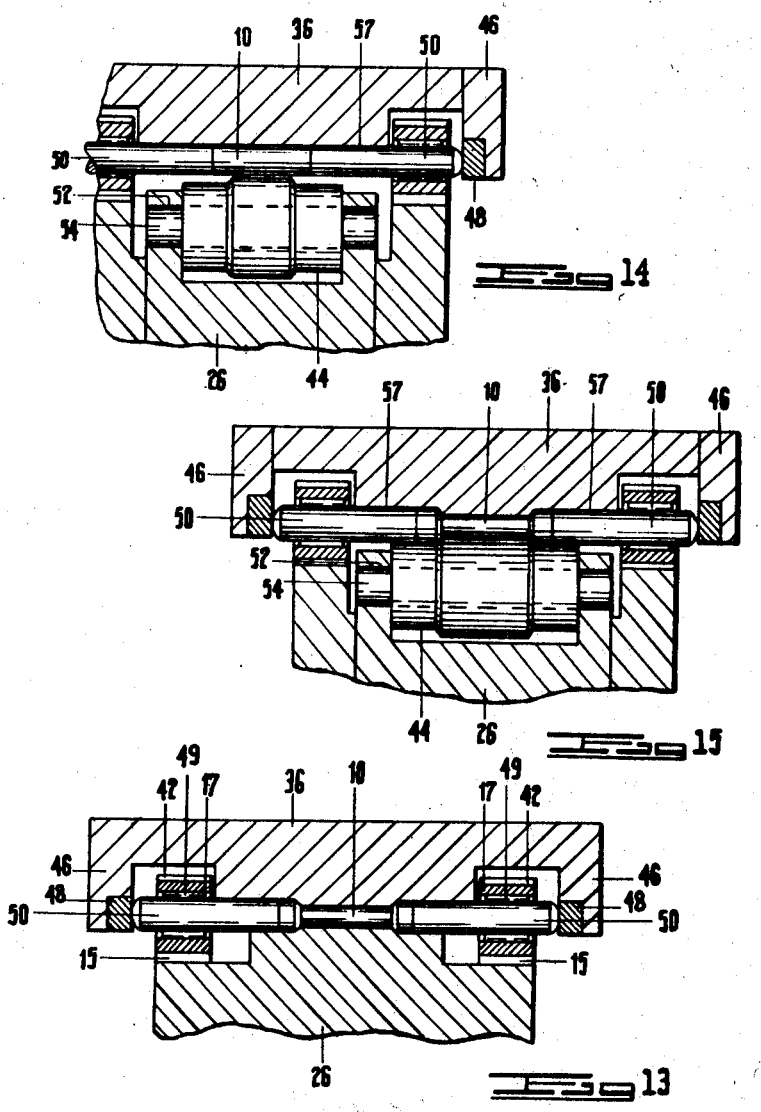

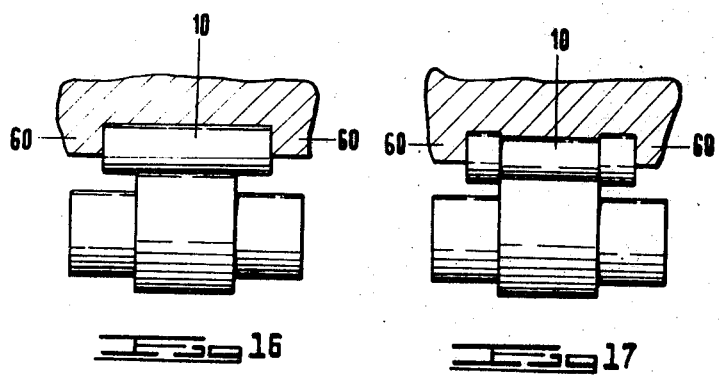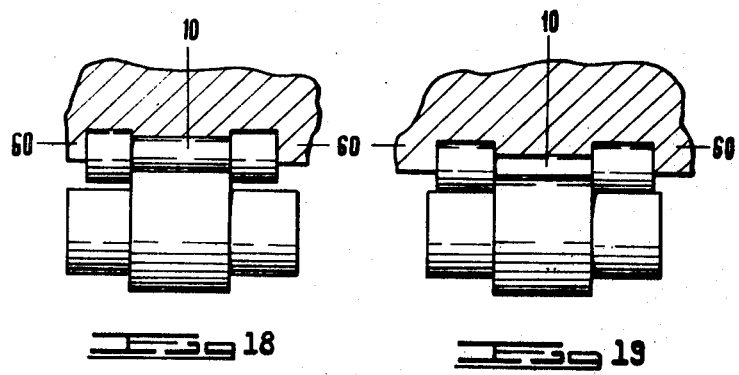

Feb. 17, 1970  J. MARCOVITCH  3,495,428
PROFILING OF SOLID CYLINDRICAL WORKPIECES
Filed Aug. 11, 1967  8 Sheets-Sheet 6
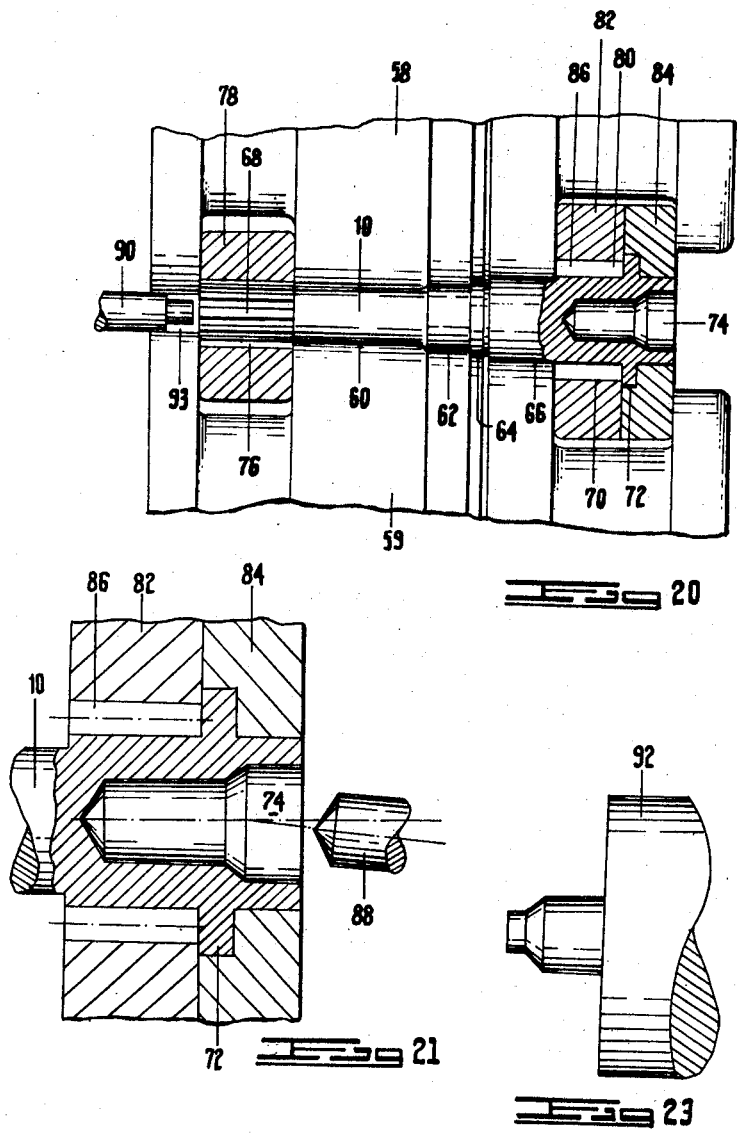
INVENTOR
JACOB MARCOVITCH
BY Young & Thompson
ATTYS.

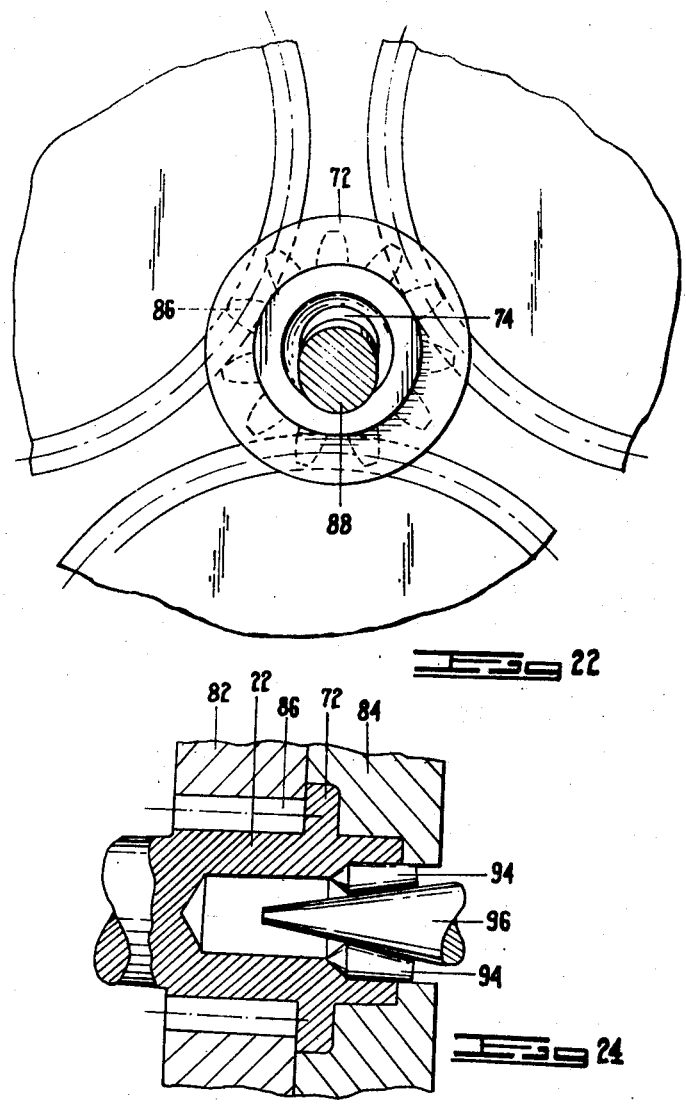

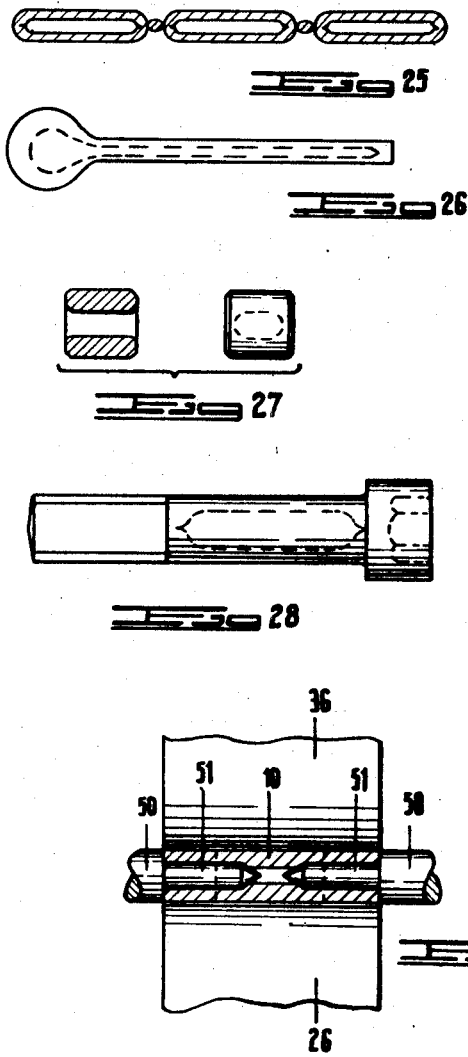

United States Patent Office 3,495,428
Patented Feb. 17, 1970

3,495,428
PROFILING OF SOLID CYLINDRICAL WORKPIECES
Jacob Marcovitch, Johannesburg, Transvaal, Republic of South Africa, assignor to Rotary Profile Anstalt, Vaduz, Liechtenstein
Filed Aug. 11, 1967, Ser. No. 659,999
Claims priority, application Republic of South Africa, Aug. 17, 1966, 66/4,912; Aug. 19, 1966, 66/4,960; Nov. 15, 1966, 66/6,902
Int. Cl. B21b 1/08, 27/00
U.S. Cl. 72—91                          15 Claims

ABSTRACT OF THE DISCLOSURE

The invention concerns a method and apparatus for profiling cylindrical blanks by rolling them to impose on their circumference a contour complemental to that of the rollers, and eliminating or controlling their tendency to form voids along their axes by applying axially inward force at their ends.

---

Figure 8:
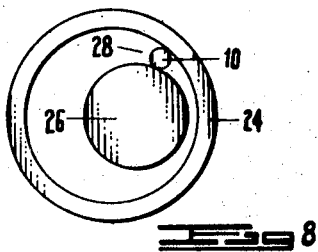

This invention relates to the profiling of solid cylindrical workpieces, the length of which is greater than the diameter, that are caused to rotate by being engaged in a throat, the walls of which are relatively rotating (and which may be defined between juxtaposed, parallel rollers) the dimension of the throat being diminished progressively to reduce the diameter of the workpiece and at the same time impose on it the complement of the contour of the throat, by plastic flow of the material of the workpiece.

The throat may be defined between two rollers. It is convergent and the workpieces are offered to it and nipped by it, and drawn through it. Alternatively, the throat may occur between three or more rollers and the diminishing extent of the throat produced by radially inward relative movement of the rollers.

One wall of the throat may be stationary and the other may rotate.

While it is by no means excluded that the workpieces be worked in the cold, usually, and certainly preferably, they will preliminarily have been heated to facilitate plastic flow as the workpiece rotates in the constricting throat.

A phenomenon which is of major significance in the rolling of solid cylindrical workpieces that are long compared with their width is that the reduction in diameter puts the axial zone of the workpiece into tension. Purely radial forces applied to a stationary workpiece cause a pressure gradient from the circumference inwardly towards the axis. If the forces are sufficiently large, the gradient will extend all the way to the axis and the whole workpiece will be in compression, intersecting at the axis. However, when the application to the workpiece of radial forces is accompanied by rolling, the forces acting on the workpieces resolve into a couple, if the throat is defined by two rollers, or a trio of forces if it is defined by three rollers. The effect is to put the central zone of the workpiece into tension. The diminution in diameter of the workpiece resulting from the rolling is permitted by plastic flow of the material of the workpiece in the longitudinal direction, which causes an increase in length; and material is first drawn from the central zone towards the ends of the workpiece. The initial effect is to cause concavity of the ends of the workpiece, and, if rolling is continued sufficiently long, the concavities are increased and a void results along the axis of the workpiece. This may be an advantage in some applications, where weight and economy are of importance, but usually it is unacceptable. The object of the present invention is to provide a technique which minimises the tendency of the workpiece to become hollowed during rolling, and to promote, if not homogeneity, at least an approximation thereto, or, if homogeneity be not the aim, to control the pressure gradient during the rolling of the workpiece.

According to the invention, the workpiece, during its period of dwell in the throat, is acted on by applied force resisting its axial spread.

Figure 9:
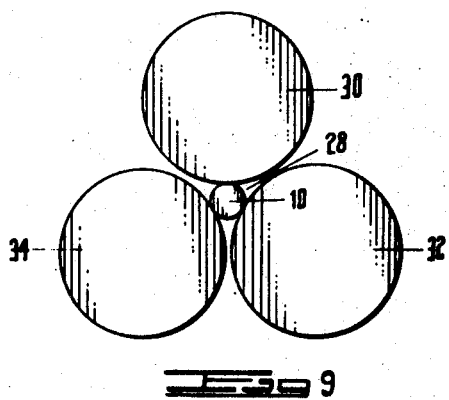
Figure 11:
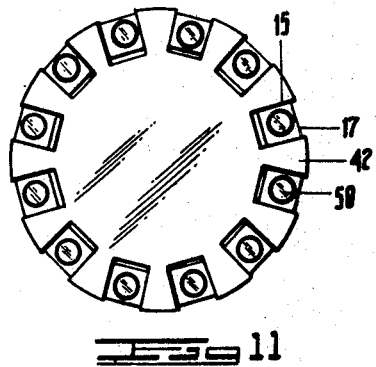

The invention is illustrated in the accompanying drawings in which:
 FIGURE 1 is a cross-sectional view through a cylindrical workpiece confined between two stationary walls;
 FIGURE 2 is a similar view, the walls being moved relatively to roll the workpiece;
 FIGURE 3 is a sectional view through a workpiece confined between three stationary rollers;
 FIGURE 4 is a view similar to that of FIGURE 3, the rollers being in station;
 FIGURE 5 is a sectional longitudinal view through a solid cylindrical workpiece that has undergone a measure of rolling.
 FIGURE 6 is a view similar to that of FIGURE 5, illustrating the effects of continued rolling.
 FIGURE 7 is a semi-schematic view of one form of rolling apparatus of a general type suitable for carrying out the invention;
 FIGURE 8 is a similar view of a second form of apparatus;
 FIGURE 9 is a similar view of a third form of apparatus;
 FIGURE 10 is a semi-sectional view of a special form of rolling apparatus;
 FIGURE 11 is an end view of a cage contained in the apparatus of FIGURE 10 and embodying features of the invention;
 FIGURE 12 is a semi-sectional view of a modified form of the apparatus illustrated in FIGURE 10;
 FIGURE 13 is a fragmentary sectional longitudinal view of detail of apparatus of the invention;
 FIGURES 14 and 15 are views similar to FIGURE 13 of modified forms of apparatus;
 FIGURES 16 to 19 are fragmentary semi-sectional views of a different form of apparatus embodying features of the invention, illustrating successive stages of the rolling of a cylindrical workpiece;
 FIGURE 20 is a semi-sectional longitudinal view of the throat portion of rolling apparatus in which a complex profile is imposed on a workpiece;
 FIGURE 21 is an enlarged view of a portion of the apparatus of FIGURE 20;
 FIGURE 22 is an end view of the apparauts of FIGURES 20 and 21;
 FIGURE 23 is a side view of a former adapted to be used in conjunction with the apparatus of FIGURES 20–22.
 FIGURE 24 is a side view of a modified former for such use;
 FIGURES 25 to 28 illustrate typical components which may be made by the methods and apparatus of the invention; and
 FIGURE 29 is a sectional longitudinal view through a form of apparatus including styli for the manufacture of gudgeon pins.

In FIGURE 1, a workpiece 10 is confined in a throat 12 defined by walls 14. With the walls stationary and pressed together, the forces acting on the workpiece pass through the axis 16 and tend merely to compress the workpiece throughout its thickness. If, however, the walls 14 are moved relatively to each other to produce rolling of the workpiece, the forces are displaced, as indicated in FIGURE 2, to form a couple. Similarly, when the throat is defined by three walls 14, as in FIGURES 3 and 4, compressive forces produced by squeezing the workpiece 10, act through the axis 16 when the walls are stationary, and form a trio of forces that straddle the axis, as seen in FIGURE 4. The zone between the lines of the forces, indicated by shading 18 and including the axis 16, is the zone that is in tension and from which material flows, as rolling proceeds. In FIGURE 5, the rolled workpiece 10, shown in longitudinal cross-section, and originally of the solid cylindrical shape shown in dotted line, is seen to have concave ends 20. The workpiece has diminished in diameter and lengthened, and the material beyond the end of the dotted workpiece, representing the increase in length, has been drawn partly from the central zone around the axis 16. In FIGURE 6, continued rolling has caused the central zone to become a void 22.

Rolling of the workpiece is diagrammatically illustrated in FIGURES 7 to 12.

In FIGURE 7, two juxtaposed rollers 24, 26, define a convergent throat 28 between them. The workpiece 10 is nipped by the throat and drawn through it. During its passage through the throat, the workpiece is progressively reduced in diameter and, whatever the contours of the rollers may be, those contours are imposed on the workpiece.

In FIGURE 8, the roller 24 is hollow and the roller 26 is mounted eccentrically within it, so that the throat 28 is convergent, as in FIGURE 7, but the convergence takes place over a longer distance.

In FIGURE 9, there are three rollers, 30, 32, 34, arranged with their axes forming a triangle. The rollers are relatively movable radially inwardly, for the throat 28 to be diminished in size. For instance, two rollers 30, 32, may be fixed, while the third, 34, is movable towards or away from them. Workpieces 10 are inserted into the throat while it is open and as the rollers approach to close the throat, the rotating workpiece is profiled in conformity with the profile of the throat.

FIGURE 10 illustrates a special form of the two-roller or two-point contact system of FIGURE 8. Here, the outer roller is replaced by a stationary C-frame 36, within which is mounted an inner roller 26 to yield an arcuate converging throat 28. Workpieces 10 are passed into the machine down a chute 30, offer themselves to the throat 28, are entrained through it, and emerge on to a chute 40, that leads them out of the machine. Alignment and correct spacing are ensured by a cage 42 into which the workpieces pass from the chute 30.

The cage 42 is illustrated in end view in FIGURE 11. Its circumference carries a number of radial slots 15, each of which contains a block 17 that is slidable in the radial direction within the slot. Mounted in bearings in each block 17 is a plunger or cam follower 50, the function and operation of which will be described more fully with reference to FIGURE 13.

In FIGURE 12, the system of FIGURE 10 is modified in that the throat is lined by a series of small rollers 44 that pass through the throat. The wall of the throat 28 defines, with the two rollers opposite it, a three-point system, each of which accommodates a workpiece 10. Each roller 44 is thus a member of two adjacent three-point systems and may be pivotally carried on the roller 26, in contact with two workpieces. Each workpiece 10 is automatically maintained at the correct spacing and alignment by the rollers surrounding it.

In what follows, the details of the machines of the invention will be related without reference to any particular kind of machine in which the operations are carried out, except when a specific kind of machine is required or one kind excluded.

In FIGURE 13, the roller 26 and the frame 36 are a two-point system of the FIGURE 10 type. The frame 36 is formed with two flanges 46 that have tracks 48 which are cams for opposed cam followers or side plungers 50 that are arranged for rectilinear motion in needle bearings 49 set in slidable blocks 17 that are contained in slots 15 of a cage 42 similar to that illustrated in FIGURE 11. Between the followers 50 is the workpiece 10, which is profiled as it passes through the throat to the dumbbell form prescribed by the contour of the frame 36 and roller 26.

Initially, the blanks fed into the throat are cylindrical, and the cam tracks 48 are at their minimum distance apart. The tracks may be parallel or may diverge along the length of the throat, until, at the narrowest point of the throat, they are at their maximum distance apart and the distance between the adjacent ends of the followers is the exact dimension prescribed as the length of the finished dumbbell.

The relationship of the two cam tracks is nicely calculated to ensure that, as the workpiece extends in length due to the diminution of diameter imposed on it as it traverses the throat, the followers bear on its ends and resist the extension to such effect that the tendency in the workpiece for a void to form is opposed. In most cases, the opposition would be such as to produce a workpiece of near-homogeneity. In other cases, where it might be desirable, for weight- or material-saving, deliberately to allow the pressure gradient to develop to a predetermined extent, the extent of divergence of the followers is made somewhat greater, to bring lesser axial forces to bear on the workpiece.

In FIGURES 14 and 15, the combination is shown of a C-frame 36 and an inner roller 26 carrying a series of small rollers 44 which may be carried by the inner roller 26. It will be observed that this construction is that shown in FIGURE 11. The rollers 44 are conveniently mounted in circumferential grooves 52 in the inner roller 26, on pins 54 that are journalled in holes in the walls 56 of the groove. FIGURE 14 shows the rolling at an early stage, and FIGURE 15 when it is near to completion.

In both embodiments—those of FIGURE 13 and of FIGURES 14 and 15—the followers 50, in contact with the ends of the rotating workpiece 10, derive rotation from it and themselves rotate in unison with the workpiece. However, to aid their rotation and that of the workpiece, they may be in contact with the C-frame 36, frictionally, or with the cooperation of serrations or fine gearing at the points indicated at 57.

It is not necessary that the axial force resisting the formation of voids be applied by two plungers movable inwardly against the ends of the workpiece. There may be employed one plunger only, the other end of the workpiece being in contact with an abutment acting as a stop to resist endwise movement of the workpiece under the compulsion of the plunger. This is not, however, a favoured construction. A better arrangement is that in which the throat 22 is closed laterally by two abutments opposed to the ends of the workpiece. The abutments diverge progressively, so that the throat is progressively controlled in width as the workpiece proceeds through it. From the time the workpiece comes into contact with the abutments due to axial spread imposed on it by the diminishing diameter, the abutments diverge but at a slower rate than the tendency of the workpiece to spread axially, so that they apply axially inward pressure to the workpiece just as do the plungers 50 of FIGURES 13 to 15, and thereby prevent the formation of a void. In FIGURES 16 to 19, four consecutive points in the throat are illustrated, and it will be seen how, as the workpiece 10 traverses the throat, the abutments 60 gradually diverge and the workpiece is progressively lengthened and shaped.

The arrangements of FIGURES 13 to 15 are suitable to make components such as gudgeon pins. This is seen in FIGURE 29. The blank 10 used is cylindrical, its initial length indicated by dotted lines, and the plungers 50 are formed with styli 51 that penetrate the blank from each end, as the plungers are moved inwardly to apply axial pressure to the blank and to "square-up" its ends towards the end of the rolling operation.

Apart from the control of the internal voids, the application of endwise force to the workpiece may be used to ensure the filling of profiling cavities into which it is desired to expand the workpiece radially. An example is seen in FIGURE 20. The throat is defined by the rollers 58, 59, the circumferences of which are profiled to impose on a cylindrical workpiece 10, four cylindrical zones 60, 62, 64, 66, a splined zone 68 and a toothed zone 70 having a flange 72 and a socketed end 74.

The initial closing of the throat causes material from the middle of the workpiece to flow plastically towards each end. On one side, the flowing material enters a profiling cavity 76, which contains a ring 78 the bore of which is splined. At the other end, there is a second profiling cavity 80 containing a ring made in two parts 82, 84, the first of which has internal teeth 86 and the second of which is shaped to produce the flange 72. Directed towards the end of the workpiece is a conical stylus 88, which is tilted relatively to the axis of the workpiece, and which can be rectilinearly advanced towards and retracted from the workpiece. This can be seen in FIGURE 21 which is an enlargement of one end of FIGURE 17. FIGURE 22 is an end view of FIGURE 12 with the anvil ring 84 removed.

There is incentive for material entering the profiling zones 68 and 70 to expand radially provided there is restraint of axial flow. Without such restraint the inclination of the material would be to follow a straight course in the direction of the axis of the workpiece rather than to flow radially. However, on the side of the zone 68, the advancing material is followed by a plunger 90 that exerts pressure on it and causes it to move readily to fill the cavity 68 and form splines on the workpiece. In the other side, the material is followed by the stylus, which is advanced to meet it. As the stylus comes into contact with the workpiece, it digs into the end of the workpiece and establishes line contact with the socket that is formed. Contact between the workpiece and the stylus causes the stylus to rotate in unison with the rotation of the workpiece, and, as the stylus is advanced the socket is enlarged and deepened and aids the filling of the profiling cavity. Simultaneously, the material displaced by the stylus and by the rollers 58, 59, is forced radially into the profiling cavity 70, to fill the spaces between the teeth 86 and to form the flange 72. The stylus may be withdrawn and replaced by a finishing former 92 (FIGURE 23) that is advanced into the socket to give it its final shape. Any surplus material that there may be (because blanks cannot economically be precision-made) is extruded into the gap 93 (FIGURE 20).

The rollers 58, 59, are then withdrawn from each other or from one another to liberate the workpiece. The ring 78 is removed axially—it can readily be tapped off the component—the ring 84 is withdrawn, and the ring 82 is tapped off and passed over the splined zone 68.

In a modification, shown in FIGURE 24, the socket 74 is finished by a series of small, conically-ended tapered rollers 94 that are arranged to orbit around a conical core 96 which is capable of being advanced towards and retracted from the workpiece.

It will be appreciated that the formation of a series of uniform components that may be of considerable complexity, can be made in a single operation, without the formation of voids or of zones of low pressure.

In most cases, the invention will be so exercised as to produce components that are as homogeneous as possible; but this will not always be so. To save weight or to save material, the axially inward force may be calculated to permit a pressure gradient to form.

In some cases components may be deliberately produced with an internal void and be closed at either end for the sake of appearance. They may be made from blanks that are initially prepared with outwardly domed ends, which have been found to prevent the formation of voids at the extremities of a workpiece.

An important aspect of the invention is that it may be used accurately to size bars with commercial tolerances in the diameter. A heated bar is first passed through a 2- or 3-point contact system and a void is produced which reflects the variance of the initial bar diameter, and is subsequently profiled to the desired shape while it is still hot. The void saves material and eases the profiling operation.

Typical hollow components produced by the use of the invention are shown in FIGURES 25 to 28. FIGURES 25 and 27 are rollers for bearings and FIGURE 28 is an Allen bolt.

It is pointed out that the initial operation may be carried out in a 3-point system, and the blank then transferred to a 2-point system for finishing. This is advantageous if part of the blank is to be profiled to a smaller diameter than is possible with a 3-point system, for instance, reduction to the smallest possible diameter for rupturing.

I claim:

1. A method of profiling solid cylindrical blanks that are longer than they are thick, by causing them to rotate by being engaged in a throat, the walls of which are relatively rotating and the dimension of which is diminished progressively to reduce the diameter of the workpiece and at the same time to impose on it the complement of the contour of the throat by plastic flow of the material of the workpiece: characterized in that, during its period of dwell in the throat, the workpiece is acted on by applied force resisting its axial spread, the axial force applied being insufficient to avoid the formation of a void.

2. A method of profiling a solid cylindrical workpiece whose axial length is longer than its diameter, comprising rotating the workpiece between relatively moving bodies, progressively diminishing the space between said bodies to reduce the diameter of the workpiece in at least localized zones and to impose on the workpiece a profile corresponding to that of the bodies, pressing against the ends of the workpiece with end-engaging means which regulate axial length variation of the workpiece during profiling, and moving the end-engaging means apart relative to each other in the axial direction of the workpiece during profiling.

3. The method of claim 2 in which the end-engaging means move relatively apart by a distance insufficient to permit the formation of an axial cavity in the workpiece.

4. The method of claim 2 in which the end-engaging means move relatively apart by a distance sufficient to permit the formation of an axial cavity in the workpiece.

5. A method of profiling a solid cylindrical workpiece whose axial length is longer than its diameter, comprising rotating the workpiece between relatively moving bodies, progressively diminishing the space between said bodies to reduce the diameter of the workpiece in at least localized zones and to impose on the workpiece a profile corresponding to that of the bodies, pressing against the ends of the workpiece with end-engaging means which regulate axial length variation of the workpiece during profiling, and rotating the end-engaging means with the workpiece during profiling.

6. Apparatus for profiling a solid cylindrical workpiece whose axial length is longer than its diameter, comprising at least two relatively movable bodies defining between them a space within which a workpiece is adapted to be engaged by the bodies and rotated by their relative movement and concurrently reduced in diameter in at least localized zones, thereby to take on a profile corresponding to the profile of the bodies, means to move the bodies relative to each other to cause the workpiece to be so rotated and profiled; end-engaging means adapted to bear on the ends of the workpiece to regulate its axial length variation during profiling; and means mounting the end-engaging means for movement relative to each other during profiling in the axial direction of the workpiece.

7. The apparatus of claim 6, in which at least one end-engaging means is a plunger, and including means to regulate the movement of the plunger in the axial direction relative to the workpiece, and mounting means holding the plunger for rotation with the workpiece.

8. The apparatus of claim 7 in which the plunger is a stylus adapted to gouge a socket in the end of the workpiece.

9. The apparatus of claim 7 in which the means to regulate the axial movement of the plunger comprises a cam track and means to cause the plunger to follow the cam track.

10. The apparatus of claim 6 in which the end-engaging means comprises abutments on at least one of the bodies defining the space within which profiling takes place.

11. The apparatus of claim 8 including a finishing former mounted to be advanced into the socket formed in the workpiece by the stylus.

12. The apparatus of claim 7 including means to drive the plunger in its rotation.

13. Apparatus for profiling a solid cylindrical workpiece whose axial length is longer than its diameter, comprising at least two relatively movable bodies defining between them a space within which a workpiece is adapted to be engaged by the bodies and rotated by their relative movement and concurrently reduced in diameter in at least localized zones, thereby to take on a profile corresponding to the profile of the bodies, means to move the bodies relatively to cause the workpiece to be so rotated and profiled; a member at each end of the space, adapted to bear on the end of the workpiece, and means mounting the members for rotation with the workpiece.

14. The apparatus of claim 13, including means to drive the members in rotation.

15. The apparatus of claim 13, in which a said member is a stylus adapted to gouge a socket in the end of the workpiece.

References Cited

UNITED STATES PATENTS

| 286,324 | 10/1883 | Maseth | 72—93 |
| 1,609,422 | 12/1926 | Olofson | 72—92 |
| 2,792,729 | 5/1957 | Prutton | 72—93 |

FOREIGN PATENTS

| 668,882 | 3/1952 | England. |

CHARLES W. LANHAM, Primary Examiner

L. A. LARSON, Assistant Examiner

U.S. Cl. X.R.

72—94, 194, 401